C. A. WILLMARTH.
STAY WIRE CRIMPING AND CUTTING MACHINE.
APPLICATION FILED MAR. 26, 1910.

999,476.     Patented Aug. 1, 1911.

Witnesses
A. M. Shannon
A. M. Dow

Inventor
Charles A. Willmarth
By Barthel & Barthel
Attorney

UNITED STATES PATENT OFFICE.

CHARLES A. WILLMARTH, OF DETROIT, MICHIGAN.

STAY-WIRE CRIMPING AND CUTTING MACHINE.

999,476.  Specification of Letters Patent.  Patented Aug. 1, 1911.

Application filed March 26, 1910. Serial No. 551,661.

*To all whom it may concern:*

Be it known that I, CHARLES A. WILLMARTH, a citizen of the United States of America, residing at Detroit, in the county of Wayne and State of Michigan, have invented certain new and useful Improvements in Stay-Wire Crimping and Cutting Machines, of which the following is a specification, reference being had therein to the accompanying drawings.

This invention relates to a machine for forming stays for wire fencing and more particularly to such a machine for forming crimped stays of any desired length from a reel of wire.

The object of the invention is to provide a simple machine for the purpose which will operate automatically to cut from a reel of wire, stays of any desired length and crimp the same, said machine being quickly and easily adjusted to vary the length of the stays or the crimps or bends in the wire.

Figures 1, 2:
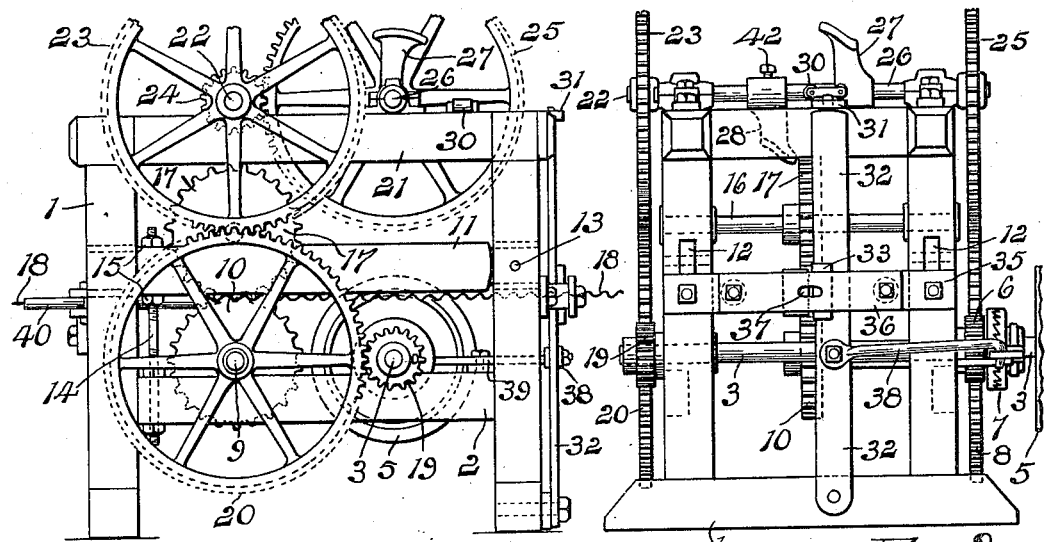
Figure 3:
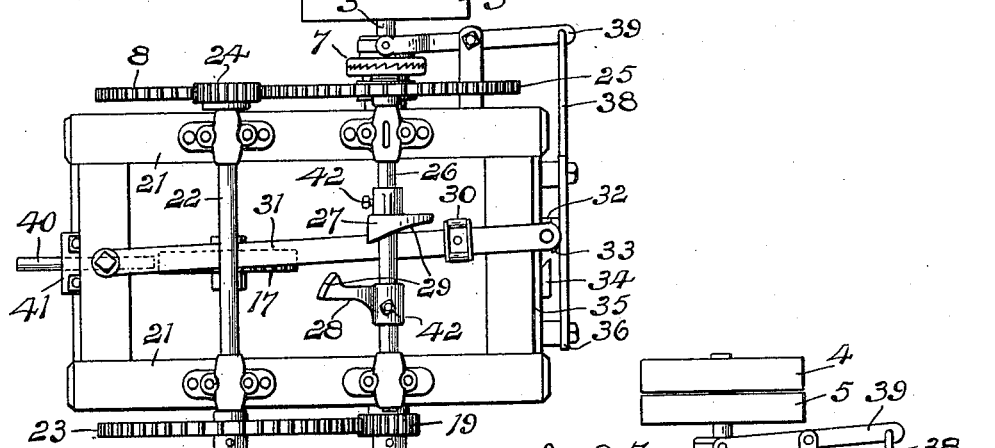
Figure 4:
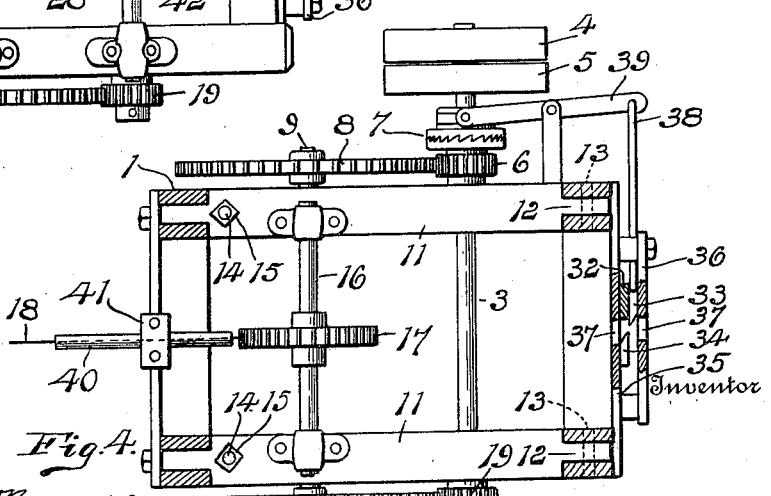

A further object of the invention is to provide certain other new and useful features in the construction, all as hereinafter more fully described, reference being had to the accompanying drawing in which, Figure 1 is a side elevation of a machine embodying the invention; Fig. 2 is a rear end elevation of the same; Fig. 3, a plan view; and Fig. 4, a horizontal section.

As shown in the drawings 1 represents a suitable rectangular supporting frame having lower cross bars 2 which support bearings for a driving shaft 3. Upon the end of the driving shaft 3 is secured a tight pulley 4 and a loose pulley 5 adapted to be engaged by a suitable driving belt. A pinion 6 is loosely sleeved upon the shaft between the frame and the pulleys, and a clutch 7 is interposed between the pinion and the pulleys, one member of the clutch being secured to the pinion and the other member slidable longitudinally upon the shaft and operatively attached thereto to transmit motion from the shaft to the pinion. Engaging the pinion 6 is a large gear 8 on the end of a cross shaft 9 which shaft is provided intermediate its ends with a crimper wheel 10 having suitable teeth or projections on its periphery to engage and bend the wire.

The frame 1 is provided with pivoted bars 11 each formed with a tenon 12 at each end to engage mortises in the vertical corner posts of the frame. The tenons at one end of the bars are pivotally secured in their mortises by pins 13 so that said bars may be raised or lowered slightly at their opposite ends within the mortises at that end and to rigidly and adjustably hold the bars at their movable ends, rods 14 are secured at one end in holes in the cross members 2 of the frame and extend upward through holes in the bars 11. Jam nuts 15 are provided on the rods above and below the bars 11 to adjustably hold said bars from turning upon their pivot pins 13, said nuts being adapted to be turned to adjust them upon the rod and raise or lower the ends of the bars 11. These bars 11 are provided with bearings for an idler shaft 16 extending across between the same and upon this shaft is secured an upper crimper wheel 17 to mate with the lower crimper wheel 10 and crimp the wire 18 as it is passed between the same.

On the end of the shaft 3 opposite that upon which the driving pulley is secured, is fastened a pinion 19 which transmits motion from the driving shaft to a large idler gear 20 loosely mounted upon the end of the transverse shaft 9. Mounted in bearings on the upper side bars 21 of the supporting frame is a cross shaft 22 having secured upon one end thereof a large gear wheel 23 in mesh with the gear wheel 20 to receive motion from said idler and turn its shaft 22. A small gear 24 on the opposite end of said shaft is engaged by a large gear wheel 25 upon the end of a shaft 26 mounted in bearings upon the side bars 21 and extending across the frame. Adjustably secured upon the shaft 26 within the frame are two arms 27 and 28 each formed at its outer end with a cam face or inclined portion 29 to engage friction rolls 30 mounted upon a bar 31 which is pivotally attached to the supporting frame at one end and extends rearwardly across the frame between the arms 27 and 28 to the rear end of the frame. A cut-off lever 32 is pivoted at its lower end to the frame near the bottom thereof and extending upward is pivotally attached at its upper end to the free end of the bar 31 so that when said bar is swung laterally by the engagement of the arms with the friction rolls carried by said bar, said lever will be turned laterally to move a cutter 33 carried by the lever, into engagement with a fixed cutter 34 secured to a cross bar 35 on the frame. The cross bar 35 and also a guide bar 36 attached thereto and embracing a lever are each formed with an opening 37 through which the crimped wire 18 is projected from the crimping wheels. The wire is thus guided within openings and passes between the two cutters 33 and 34 so that when the lever 32 is operated a stay will be cut off of the desired length.

A connecting rod 38 is pivotally attached at one end to the lever 32 and at its opposite end is pivotally attached to a lever 39 pivoted intermediate its ends upon a suitable support and attached at its opposite end to the movable member of the clutch 7 to move said member.

The wire 18 is taken from a reel (not shown) and directed between the crimper wheels by a tube or iron pipe 40 which is adjustably secured to the supporting frame at its forward end by clamping plates 41.

The wire is fed through the machine by the turning of the lower crimper 10 which is driven by means of the gears 6 and 8 and clutch 7. The frequency of the operation of the cutter lever and the length of the stay is determined by the relative position of the two arms 27 and 28 upon the shaft 26 which shaft receives a continuous rotary motion from the driving shaft. When the parts are in the position shown in Fig. 3 and the shaft 26 is turned to bring the inclined face of the arm 27 into contact with the friction roll on the bar 31, said bar will be shifted by said incline, swinging the lever 32 over and cutting off the wire, the feeding of the wire being stopped just previous to its being cut off by the throwing out of the clutch 7 which is operated by the swinging of the lever 32, said lever being connected to the clutch through the rod 38 and lever 39. The crimpers will stand still and no wire will be fed through until the shaft 26 has been further turned to bring the inclined portion of the arm 28 into engagement with the bar 31 to move said bar back to the position shown in Fig. 3, such movement throwing the clutch into operation and starting the crimpers. The time which elapses between the throwing in of the clutch by the arm 28 and the throwing out of the clutch by the arm 27 determines the length of the stay and thus a short or long stay may be cut as desired by loosening the set screws 42 which hold the arms upon the shaft 26, and turning said arms upon said shaft.

By adjusting the crimper wheel 17 toward or from the crimper wheel 10 by moving the supporting bars 11 upon which the idler shaft 16 is mounted, bends or crimps of greater or lesser depth may be put in the wire.

Having thus fully described my invention what I claim is:—

1. In a machine of the character described, crimpers, a cutter for severing a wire, means for actuating the cutter, and a disconnecting device operating in timed relation to the operation of the cutter to stop and start the crimpers.

2. In a machine of the character described, crimpers, a cutter for severing the wire, means for actuating the crimpers, continuously operating means for actuating the cutter, a controlling device controlling the action of the crimpers, and means for actuating said device in timed relation to the operation of the cutter to stop and start the crimpers.

3. In a machine of the character described, crimpers, a cutter for severing a wire, means for actuating the crimpers, a shaft, and arms adjustably secured to the shaft to actuate the cutter.

4. The combination of crimpers, means for actuating the same, a cutter for severing a wire, a pivoted member for actuating the cutter, a shaft, and arms adjustably secured to the shaft and adapted to engage the pivoted member and actuate the same when the shaft is turned.

5. The combination of a continuously rotating shaft, a cutter for severing a wire, arms adjustably secured to the shaft, a member for moving the cutter adapted to be engaged and moved by said arms, crimpers, means for actuating the crimpers, and a device for controlling the actuation of said crimpers actuated by the member for moving the cutters.

6. The combination of crimpers, means for actuating the crimpers, a cutter for severing a wire, a pivoted member for actuating the cutter, rotatable and adjustable arms for engaging and actuating said member, and a clutch operated by the actuation of the cutter to stop and start the crimpers.

7. The combination of crimpers, means for actuating the crimpers, a cutter for severing a wire, a shaft, arms adjustably secured upon the shaft, a pivoted bar for moving the cutter extending between the paths of the arms and adapted to be actuated alternately by said arms, and means for turning the shaft.

8. The combination of a supporting frame, a shaft extending transversely of said frame and supported in bearings thereon, a crimper wheel upon said shaft, supporting members on the frame pivotally attached thereto at one end, means at the opposite ends of said members for adjusting the same, a shaft supported in bearings upon said members, a crimper wheel upon said shaft to coöperate with the other crimper wheel and crimp a wire between them, and means supported by the frame for severing a wire.

9. The combination of a supporting frame, crimper wheels, means on the frame for turning the crimper wheels, a lever pivotally attached to the frame, a cutter carried by the lever, a bar pivotally attached to the frame at one end and engaging the free end of the lever at its opposite end to move the same, a shaft extending transversely across the frame, arms adjustably secured to the shaft and provided with inclines to engage the pivoted bar and turn the same upon its pivot, and means for actuating said shaft independently of the crimper wheels.

10. The combination of a supporting frame, a driving shaft mounted in bearings upon said frame, a shaft mounted in bearings on the frame, a crimper wheel on said shaft, means for transmitting motion from the driving shaft to said crimper shaft, an idle crimper wheel to coöperate with the driven crimper wheel, a cutter, a pivoted bar for actuating the cutter, a cutter actuating shaft mounted in bearings on the frame, means for transmitting motion from the driving shaft to the cutter operating shaft, arms adjustably secured to the cutter operating shaft adapted to engage and operate the pivoted bar, and a clutch actuated in timed relation to the movement of the cutter to stop and start the crimpers.

11. The combination of a supporting frame, a driving shaft mounted in bearings on said frame, a pinion loosely mounted upon said shaft, a clutch for connecting the pinion to the shaft to receive motion therefrom, crimper wheels, and means for transmitting motion from the pinion to actuate the crimper wheels, a cutter, a pivoted lever for actuating the cutter, means attached to the lever for actuating said clutch, a shaft mounted transversely on the frame, arms adjustably secured to the shaft and provided with inclines at their outer ends to engage and actuate the lever for moving the cutter, and means for transmitting motion from the driving shaft to the transverse shaft.

12. The combination of a supporting frame, a driving shaft mounted in bearings upon said frame, a crimper shaft extending parallel with the driving shaft, gears on the driving shaft, a crimper shaft for transmitting motion from one to the other, an idler shaft mounted on the frame above the crimper shaft, a crimper wheel upon the crimper shaft, an idler crimper wheel upon the idler shaft to coöperate with the other crimper wheel to crimp a wire between them, a lever pivotally attached at one end to the frame, a cutter carried by the lever intermediate its ends, a bar pivotally attached to the frame at one end and at its opposite end to the lever, a cutter-actuating shaft mounted in bearings on the frame transversely to said bar, arms on said cutter-actuating shaft adjustably secured thereto at each side of said bar and provided with inclines at their outer ends to engage and move the bar, means for transmitting motion from the driving shaft to said cutter-actuating shaft, a clutch for transmitting motion from the driving shaft to the gear thereon for transmitting motion to the crimper shaft, a lever for actuating the clutch to disconnect the same from the driving shaft, and a rod connecting said lever with the lever carrying the cutter.

In testimony whereof I affix my signature in presence of two witnesses.

CHARLES A. WILLMARTH.

Witnesses:
OTTO F. BARTHEL.
ANNA M. DORR.

---

Copies of this patent may be obtained for five cents each, by addressing the "Commissioner of Patents, Washington, D. C."